Aug. 31, 1943.  W. H. WOODWARD  2,328,244
CIRCULAR SAW MACHINE
Filed Feb. 24, 1941   2 Sheets-Sheet 1

Inventor
William H. Woodward
By J. S. Murray
Attorney

Aug. 31, 1943.   W. H. WOODWARD   2,328,244
CIRCULAR SAW MACHINE
Filed Feb. 24, 1941   2 Sheets-Sheet 2
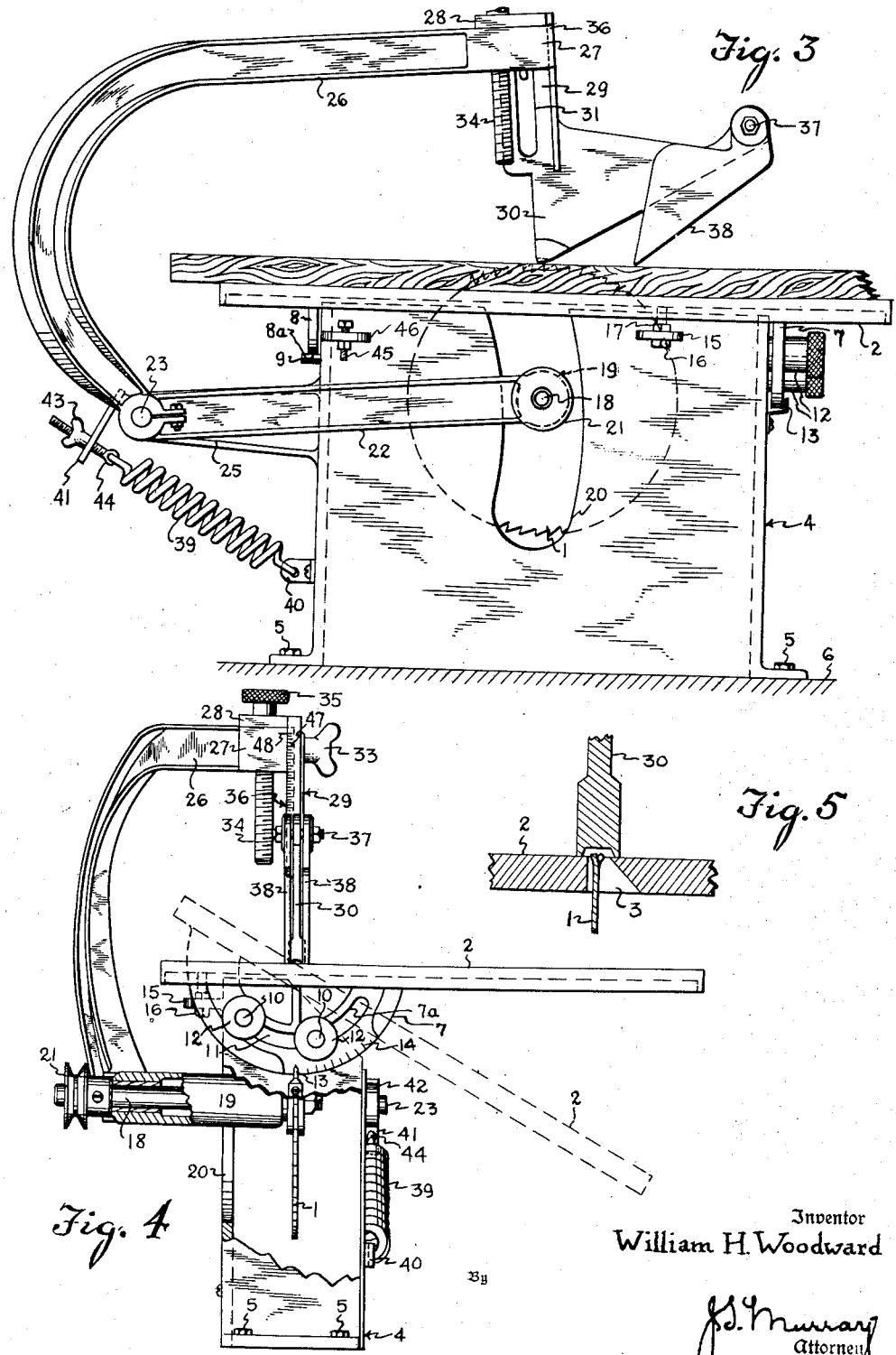
Inventor
William H. Woodward Patented Aug. 31, 1943

2,328,244

UNITED STATES PATENT OFFICE 2,328,244

CIRCULAR SAW MACHINE

William H. Woodward, Detroit, Mich.

Application February 24, 1941, Serial No. 380,107

11 Claims. (Cl. 143—41)

This invention relates to circular saw machines and particularly to saw guards for such machines.

An object of the invention is to adapt the saw of the circular saw machine to be raised and lowered relative to a work table, and to dispose a control shoe in the path of the work and in advance of the saw, said shoe being adapted to be lifted by the work to an extent determined by the work thickness, and the saw being so responsive to said shoe as to be lifted thereby to an extent equal or proportionate to lifting of the shoe.

Another object is to decrease the effort entailed in lifting said shoe and the saw by adapting a spring or the like to partially counterbalance the weight of the parts to be lifted.

A further object is to provide for a substantially vertical adjustment of the saw as regards its initial relation to the table top, so that the effective lifting of the saw by the shoe may be less than the thickness of work when it is desired to cut only partially through the work.

A further object is to arrange a plurality of pivotal guards in the path of the work as it advances along the table, to the saw, one or more thereof being engageable with the work in advance of another and being pivotally carried by the latter.

A further object is to provide a yoke rigidly connecting a circular saw with a shoe resting on the saw table, so that lifting of the shoe by the work will proportionately lift the saw, and to adapt the shoe to be very accurately vertically adjusted relative to the yoke to accurately predetermine the depth of a cut taken by the saw.

These and various other objects of the invention are attained by the construction hereinafter described and illustrated in the accompanying drawings, wherein:

Fig. 3 is a left side view.

Fig. 4 is a front view.

Fig. 5 is a fragmentary section on line 5—5 of Fig. 2, showing how the table is slotted to accommodate the saw.

Figure 1:
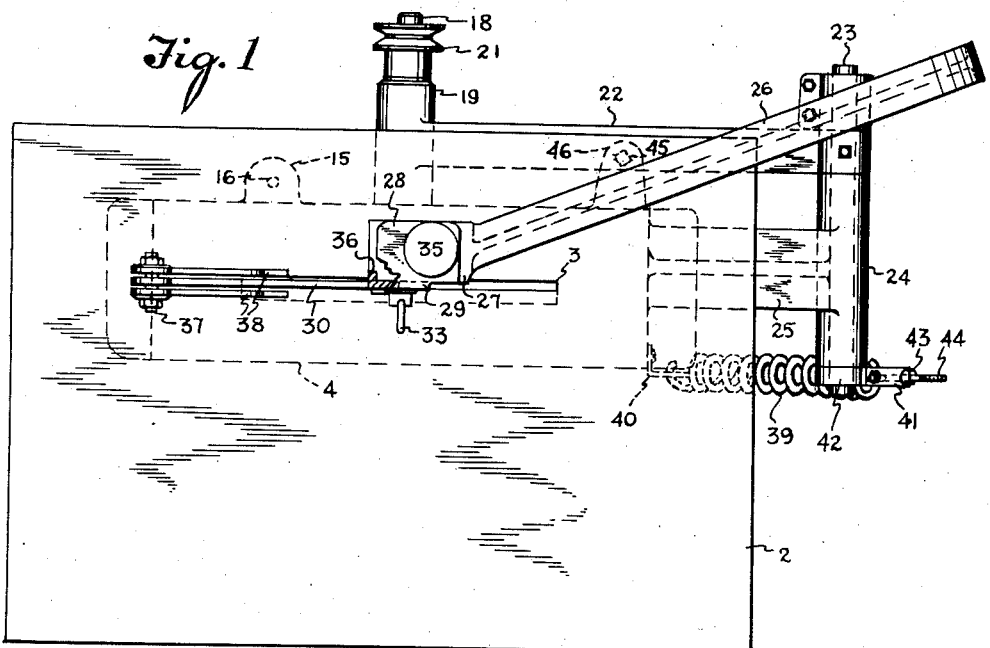
Fig. 1 is a top plan view of the improved saw machine.

In these views, the reference character 1 designates a vertically disposed circular saw and 2 a work table formed with a slot 3 through which an upper portion of the saw may project to engage work. The table surmounts and covers a rectangular housing 4 for the saw, fastened by bolts 5 or the like to a work bench 6 or other suitable support. For reasons hereinafter disclosed, it is preferred to locate the saw and its housing relatively close to one side of the table, the left side in the illustrated construction.

It is preferred to adapt the table for lateral tilting so that a cut may be taken at selective angles to the supported face of the work. Thus a pair of semi-circular brackets 7 and 8 are rigidly secured to the table and project downwardly therefrom in exterior proximity to the front and rear walls of the housing 4, said brackets having arcuate edges 7a and 8a, so seated as to adapt the brackets and table to turn about the axis of curvature of said edges, such axis being located substantially in the plane of the top face of the table. Thus the rear bracket 8 seats on a pair of spaced pins 9 projecting rigidly from the rear wall of the housing, and the front bracket seats on a pair of bolts 10, spaced similarly to the pins 9 and rigidly forwardly projecting from the housing. To accommodate said bolts, the front bracket is slotted along its edge 7a, as indicated at 11, and clamping nuts 12 engage said bolts to clamp the bracket 7 against the housing and thus maintain any adjusted position of the table. A pointer 13 secured to the housing beneath the front bracket coacts with a degree scale 14 on such bracket to permit a desired inclination of the table to be accurately established. The slot 3 of the table has one of its walls beveled at an approximate forty-five degree angle so that the saw may not interfere with desired tilting of the table. (See Fig. 5.) A lug 15 integrally projecting from the left side wall of the housing, carries a screw 16 serving as an adjustable stop to determine the horizontal position of the table, and a lock nut 17 on such screw maintains a desired adjustment thereof.

The saw 1 is suitably fixed upon the inner end of a horizontal mandrel 18, which together with its elongated bearing sleeve 19, projects through a vertically elongated slot 20 in the left wall of the housing 4, said mandrel outwardly projecting beyond the bearing sleeve to receive a drive pulley 21. The bearing sleeve is rigidly and preferably integrally carried by an elongated rocker arm 22 rearwardly extending from said sleeve and fixed at its rear end, in any suitable manner, on a rock shaft 23 parallel to the saw mandrel and spaced rearwardly from the housing. The shaft 23 is journaled in a sleeve bearing 24 integrally formed on the rear end of a bracket 25, rigidly and preferably integrally projecting from the housing. Upon the outer end of the rock shaft is clamped an arm 26, extending from said shaft in a rearward and upward semi-circular curve and then projecting forwardly and approaching the vertical axis of the saw, at an acute angle to the vertical plane of the saw, as best appears in Fig. 1. It will be noted that the arms 22 and 26, together with the rock shaft 23, form a yoke, pivotal about the axis of said shaft.

Figure 2:
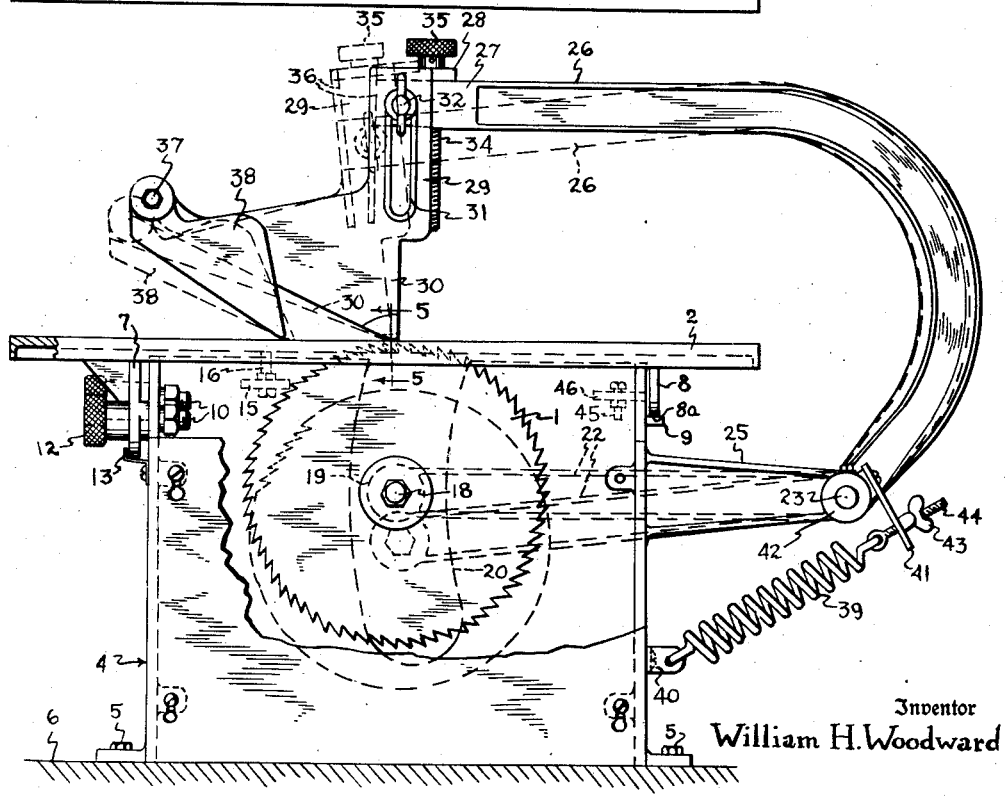
Fig. 2 is a right side view of the machine.

Over a rectangular head 27, integrally formed upon the forward end of the arm 26, there projects a lug 28 integrally projecting from the upper end of a shank 29, integrally carrying at its lower end a triangular shoe 30, normally seating on the table 4. Said shoe is materially wider than the saw and is bisected by the central rotational plane of the saw. A work-engaging edge of said shoe extends forwardly from its table-engaging apex, at an acute angle to the table, said apex being substantially above the saw axis. Thus work advancing along the table to the saw must encounter and raise the shoe 30 to a seat upon such work, before reaching the saw. The seating apex of the shoe is upwardly channeled, as best appears in Fig. 5, to afford clearance to the saw teeth as they cut through the top face of the work. The shank 29 is vertically slotted, as indicated at 31, and a bolt 32, tapped into the head 27, projects through the slot 31 and is provided with a wing head 33 for clamping said shank and the shoe to the head in selective angular positions of the arm 26. To permit an accurate adjustment of the head 27 with reference to the shoe 30, an adjusting screw 34, projecting toward the table 4, is tapped through said head, passing freely through the lug 28, the upper end of said screw carrying a head 35 seating on said lug and providing for actuation of the screw. Upward withdrawal of said screw from the head permits the latter, together with its supporting yoke to swing downwardly about the rock shaft 23, as exemplified in dash lines in Fig. 2. It is preferred to form the shank 29 with a rib 36 bearing against the front face of the head 27 to assure constant parallelism of the slot 31 with the adjusting screw 34.

Copivotally mounted on the forward end of the shoe 30, by means of a bolt 37, is a pair of rearwardly projecting triangular guards 38, one at each side of the shoe, said guards having apices normally freely seating upon the table a few inches forward of the seating point of the shoe and having edges forwardly and upwardly extending from said apices in an acutely angular relation to the table. Thus said edges are adapted to encounter work advancing to the saw and to effect raising of the guards and seating thereof upon the work. The seating apices of the guards preferably present fairly sharp edges to the work offering strong resistance to such back thrust as is applied to the work by the saw.

In order to reduce and nicely regulate the effort involved in raising the shoe, yoke, and saw, it is preferred to subject the yoke to a spring largely counterbalancing the gravitational turning moment of said parts. As illustrated, a coiled spring 39 is rearwardly and upwardly extended from an anchoring bracket 40 on the housing to a short arm 41 secured to and downwardly projecting from a set collar 42 fixed on the rock shaft 23, the tension of said spring being applied to the arm by a wing-nut 43 adjustable on an eye-bolt 44 from which the spring extends. Obviously, other types of springs or weights might serve the same purpose. The set collar 42 further coacts with the arm 22 to restrain the shaft 23 from lengthwise shifting.

To assure against any excessive upward actuation of the yoke and saw, as would result from an effort to sever work of greater thickness than is permitted by dimensions of the machine, an adjustable stop in the nature of a screw 45 may be mounted in a lug 46 upon the housing, engaging the arm 22 in a limiting raised position.

In use of the described saw, the advancing work first encounters the guards 38, swinging them up on their common pivot 37 until they rest on the work. Upon a slight further advance, the work engages the shoe 30, raising same to seat on the work. Since the shoe is normally firmly clamped to the head 27, the yoke comprised by arms 22 and 26 is upwardly swung about the rock shaft 23, thus raising the saw. The lift of the shoe being equal to the thickness of the work, and the lift of the saw being substantially equal to that of the shoe, it follows that the saw will be raised a distance substantially equal to the work thickness. If the saw blade projects initially slightly above the table, as for example $\tfrac{1}{16}$ of an inch, it will be raised sufficiently to cut through the work, with a slight excess to assure complete severing. If it is desired to only partially sever the work, the saw is initially lowered below the table top a distance equal to the difference between the work thickness and the desired depth of the kerf to be cut, such an adjustment being shown in dash lines in Fig. 2. Thus if a one inch board is to be severed through half its thickness, the saw is dropped one half inch below the table top. To permit the saw to be readily lowered a desired distance, a scale 47 indicating suitable increments of height, as fractions of an inch, may be laid out on the front face of the rib 36 to coact with a suitable index mark 48 on the front face of the head 27. Owing to slight differences between the head 27 and saw 1, as regards their radii and directions of travel, the scale 47 will not be laid out in the actual units of length indicated by said marks, said units being arbitrarily selected to accurately indicate the saw adjustment.

Primary advantage of the described construction lies in fact that an operator of the machine is positively prevented from engaging his hands with the teeth of the rotating saw. During major portion of engagement of the saw by the work, the latter itself serves as a highly effective guard, since the saw is prevented from materially projecting above the work. Primary danger to the operator of the circular saw lies in the sudden exposure of the blade as it cuts through the rear end of a piece of work. This danger is eliminated by the described construction since the guards 38 drop down behind the work as its rear end approaches the saw, preventing any application of thrust to the work in the plane of the saw.

In the construction illustrated, the arm 22 is substantially horizontal when the saw periphery is substantially tangential to the top plane of the table. Larger or smaller saws may be established in the same relation to the table by suitably changing the angular mounting of the arm 22 on the shaft 23.

The U-shaped form of the rear portion of the arm 26 and the divergent relation of the vertical plane of said arm to that of the saw tends to establish a maximum clearance for both the width and length of work delivered to the described machine.

It will be understood that a miter gauge or other common accessories may be applied to described saw, if desired.

What I claim is:

1. A circular saw machine comprising a circular saw, a table for supporting work fed to the saw, the axis of rotation of the saw being below the table level and the saw extending peripherally above said level to engage the work, a bearing mounting the saw rotatively, a shoe disposed substantially above the saw and normally in the work path and in close proximity to the plane established by the work supporting face of the table, said shoe presenting to the work a face converged acutely toward the table in the direction of work feed, and thus being adapted to be raised by the work, and a connection from the shoe to the bearing for raising the bearing proportionately to raising of the shoe, whereby the depth of cut taken by the saw may be regulated by the thickness of the work.

2. A circular saw machine comprising a circular saw, a table for supporting work fed to said saw, a support mounting the saw rotatively, a shoe disposed above and normally in close proximity to said table and substantially above the saw and presenting to the work a face converged acutely toward the table in the direction of work fed, a support for said shoe, and means pivotally mounting said supports and interconnecting them for up and down travel in unison, whereby said shoe is adapted to be raised by work fed to the saw and to correspondingly raise the saw.

3. In a circular saw machine as set forth in claim 1, means for adjusting said connection to selectively regulate the spaced relation of the saw to the shoe.

4. In a circular saw machine as set forth in claim 1, a spring acting on said connection to assist in raising the saw.

5. In a circular saw machine as set forth in claim 1, an adjusting screw attaching said shoe to said connection and adapted to raise or lower the saw relative to the shoe.

6. In a circular saw machine as set forth in claim 1, an adjusting screw attaching said shoe to said connection and adapted to raise or lower the saw relative to the shoe, and means for rigidly clamping the shoe to said connection in selective positions established by said screw.

7. A circular saw as set forth in claim 1, said connection comprising arms extending substantially rearwardly from said shoe and bearing, and means horizontally spaced from the table and rigidly interconnecting said arms.

8. A circular saw machine comprising a circular saw, a table for supporting work fed to said saw, a housing for said saw underlying and carrying said table, a support mounting the saw rotatively, a shoe normally resting on said table and presenting to the work a face acutely divergent to the table, a support for said shoe spaced above the table, a yoke rigidly connecting said supports, and means pivoting the yoke to turn about an axis spaced from said housing and parallel to the saw axis, whereby the shoe may be raised by the work and will correspondingly raise the saw.

9. A circular saw machine as set forth in claim 8, said yoke including an upper arm projecting substantially rearwardly from the shoe support and having a downwardly extended rear portion, an arm extending substantially rearwardly from the saw support, and a rock shaft rigidly interconnecting said arms.

10. In a circular saw machine, the combination with a circular saw and a table for supporting work fed to said saw, said saw being normally disposed substantially in its entirety below the work surface of said table, of a control element normally in the path of work advancing to said saw and movable by the work to clear said path, and a connection from said element to the saw for raising the saw proportionately to the movement of said element, whereby the depth of the cut taken by the saw is regulated by the thickness of the work.

11. A circular saw machine comprising a circular saw, a table for supporting work fed to the saw, a support beneath the level of the table mounting the saw rotatively, a shoe normally resting on said table and presenting to the work a face actutely divergent to the table, a yoke having a lower extremity rigidly carrying said saw support and having an upper extremity extending substantially above said shoe to transmit load from the saw and support to the shoe, means pivoting the yoke to turn about an axis substantially parallel to the saw axis, and remote from the saw axis in the direction of work feed, and a connection between the shoe and upper extremity of the yoke, including means for selectively adjusting the shoe upwardly and downwardly on the yoke to establish selective pivotal positions of the yoke and to thereby selectively raise and lower the saw.

WILLIAM H. WOODWARD.